E. BUTLER & G. M. PECK.
BUTTER WORKER.
No. 18,497. Patented Oct. 27, 1857.
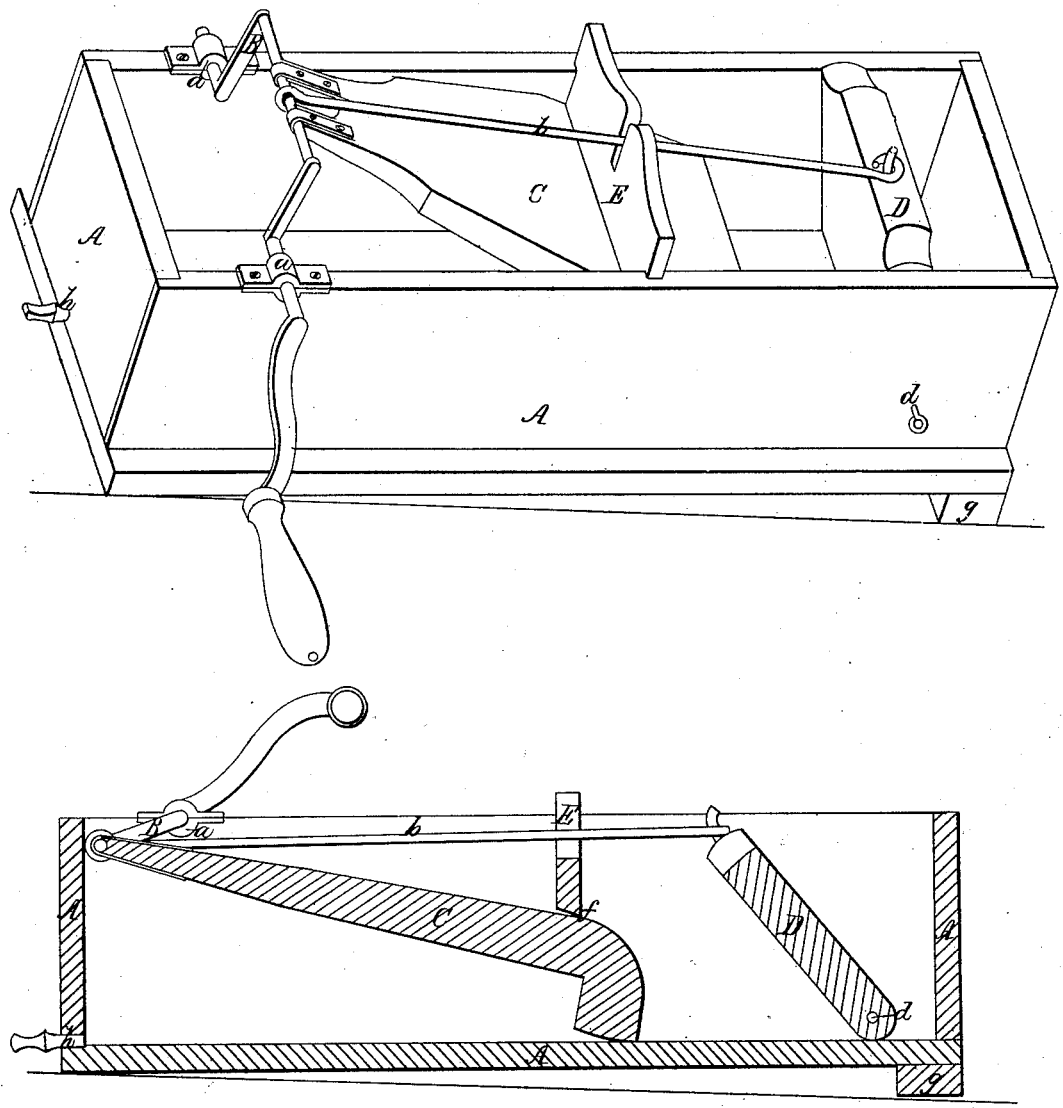

UNITED STATES PATENT OFFICE.

E. BUTLER, OF POMPEY, NEW YORK, AND GEO. M. PECK, OF ABINGTON, PENNSYLVANIA.

BUTTER-WORKER.

Specification of Letters Patent No. 18,497, dated October 27, 1857.

*To all whom it may concern:*

Be it known that we, EBENEZER BUTLER, of the town of Pompey, county of Onondaga, and State of New York, and GEORGE M. PECK, of the town of Abington, county of Luzerne, and State of Pennsylvania, have invented a new, useful, and Improved Machine for Working Butter; and we do hereby declare that the following is a full and exact description thereof, reference being had to the accompanying drawings and to the letters of reference thereon.

The nature of our invention consists in providing a box or trough, in which is placed a plunger, crank and partition so combined as that when the crank is operated the partition and plunger shall have a vibration and act upon the butter, placed between them, with a rolling motion, thereby causing the butter to be constantly in motion and to be worked thoroughly and compactly. We also have a scraper arranged to work up and down in grooves in the sides of the box, in connection with the plunger, so as to clear it of any butter adhering to it.

To enable others skilled in the art to make and use our invention, we will proceed to describe its construction and operation.

We construct a box 2½ feet in length, 11 inches in width and 7 inches in height, as represented in the accompanying drawings at A, A. In this box we place the plunger C, the rear end of which is attached to the bent crank B. This plunger is, at the opposite end from the crank, made about three inches thick and of equal width with the inside of the box and so that it may, when operated, move easily upon the bottom of the box, and is rounded at the upper edge. Said plunger is about 15 inches in length. The rear end of this plunger is attached to the crank B, so that it may move on it. The crank B is bent out from a straight line about 4 inches and is placed on the top of the box A A, at *a*, *a*. At the opposite end of the box A, A, is placed the block or partition D, of length and height to correspond with the width and depth of said box, and about one inch thick. This block or partition is secured to its proper place by the pivots *d d*, at the end and near the bottom passing through the sides of the box. The top of this block or partition is attached by the rod *b*, to the crank or plunger, in such a way as that in operating the crank the top of the partition shall move backward and forward with the plunger. We also arrange the scraper E, to move up and down in grooves in the sides of the box A, A, above and in connection with the plunger as represented at *f, f*. On the bottom of the box A, A, at *g* we place the transverse piece to raise that end of the box, that the milk may flow to the opposite end and out at the hole *h*. Having the machine thus arranged we place the butter in the box A, A, between the plunger and partition. Then, by giving the crank a rotary motion, we force the plunger against the butter, thereby pressing it together more compactly and freeing it from milk. We also give the butter a rolling motion, thus working it evenly and thoroughly.

What we claim as our invention and desire to secure by Letters Patent is—

The arrangement of the crank B, the plunger C, the partition D, and scraper E to work in combination as described, in the process of working butter.

EBENEZER BUTLER.
GEO. M. PECK.

Attest:
ANDREW BEDFORD,
H. S. COOPER.